United States Patent
Cwycyshyn et al.

[11] 3,730,004
[45] May 1, 1973

[54] SENSOR

[75] Inventors: Walter Cwycyshyn, Detroit; Elwyn L. Kitchen, Jr., Troy, both of Mich.

[73] Assignee: General Motors Corporation, Detroit, Mich.

[22] Filed: Apr. 23, 1971

[21] Appl. No.: 136,880

[52] U.S. Cl...................73/514, 102/78, 116/114 AH
[51] Int. Cl...............................................G01p 15/02
[58] Field of Search........................102/73, 78, 72, 7; 73/514, 492; 116/114 AH

[56] References Cited

UNITED STATES PATENTS

| | | | |
|---|---|---|---|
| 2,857,842 | 10/1958 | Malm | 102/8 |
| 3,397,635 | 8/1968 | Madlener | 102/8 |
| 3,580,176 | 5/1971 | Boswell | 73/514 |
| 3,592,156 | 7/1971 | Prachar | 73/492 X |
| 3,625,178 | 12/1971 | Prachar | 73/492 X |

*Primary Examiner*—Samuel W. Engle
*Attorney*—W. E. Finken and Herbert Furman

[57] ABSTRACT

A sensor includes a base plate and a generally vertically extending tubular guide provided intermediate the ends thereof with two diametrically opposed radial openings. A firing pin is slidably mounted within the guide and is spring biased toward one end of the guide to an actuated position wherein the pin engages a cartridge to fire the cartridge and actuate an inflatable cushion of an occupant restraint system. An annular seismic mass surrounds the guide and is pivotally supported thereon for movement about an axis transverse of the guide axis and direction of movement of the operator. The mass axis is further coplanar with the axis of the openings in the guide. The mass includes a pair of diametrically opposite axially and radially directed shoulders having grooves which open to the guide openings and cooperate with an annular groove on the firing pin to trap respective balls therebetween and detent the firing pin against movement. The balls are freely received within the guide openings. When the mass receives an acceleration pulse of predetermined amplitude and time directed angularly and preferably normal to the axis thereof, it swings about the axis to move the grooves thereof out of engagement with the balls and permit the firing pin spring to move the firing pin to actuated position as the balls move outwardly of the guide openings.

5 Claims, 4 Drawing Figures

Patented May 1, 1973
3,730,004
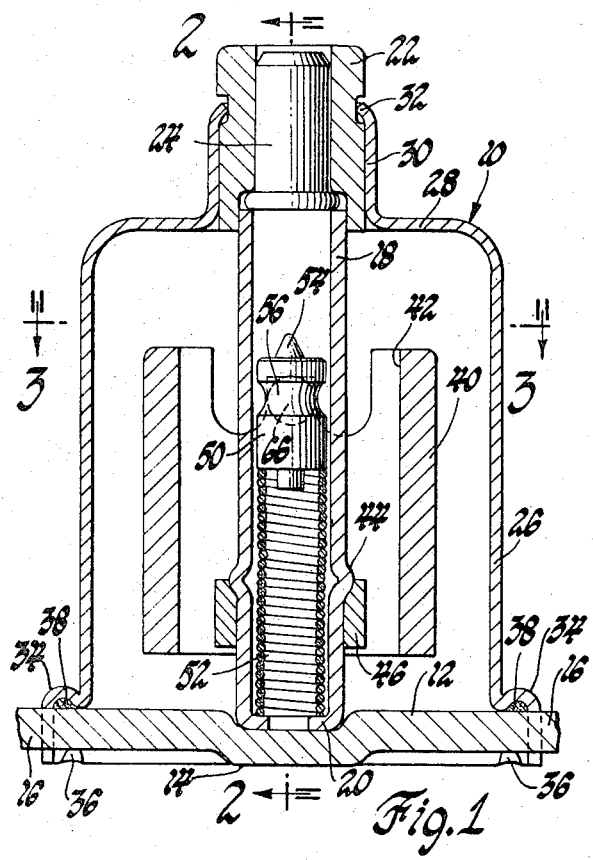
INVENTORS.
Walter Cwycyshyn &
BY Elwyn L. Kitchen, Jr.
Herbert Newman
ATTORNEY

SENSOR

This invention relates generally to sensors and more particularly to sensors of the type including a seismic mass movable under an acceleration pulse of predetermined amplitude and time to release a detented operator for movement to actuated position.

One of the features of the sensor of this invention is that the seismic mass is pivoted for movement under the acceleration pulse about an axis transverse to the direction of movement of the operator, with the swinging movement of the mass under the pulse releasing the operator detent. Another feature of this invention is that the operator moves axially of an elongated guide and that the mass includes a plurality of axially and radially directed shoulders cooperating with shoulders of the operator to detent balls therebetween and detent the operator against biased movement to actuated position. A further feature of this invention is that the shoulders of the mass include grooves directed axially and radially of the guide and coplanar with the mass axis for engaging the balls. Yet another feature of this invention is that the operator includes an annular groove which cooperates with respective grooves of the mass shoulders to detent the balls therebetween and thereby hold the operator against biased movement.

These and other features of the sensor of this invention will be readily apparent from the following specification and drawings wherein:

FIG. 1 is a sectional view of a sensor according to this invention in unactuated position;

FIG. 2 is a sectional view taken generally along the plane indicated by line 2—2 of FIG. 1;

FIG. 3 is a view taken generally along the plane indicated by line 3—3 of FIG. 1; and FIG. 4 is a view similar to FIG. 1 showing the sensor in actuated position.

Referring now to FIGS. 1 through 3 of the drawings, a sensor 10 according to this invention includes a generally rectangularly shaped base or mounting plate 12 having a central cylindrical depression 14 and a pair of laterally extending apertured ears 16, FIG. 3, which provide for securement of the plate 12 to a suitable support, such as a portion of a vehicle body.

A cylindrical guide tube 18 includes a partially flanged one end 20 which seats within the depression 14. The other end of the tube 14 is received within a counterbore of a cylindrical member 22 and engages the flange of a conventional cartridge 24 to locate and retain the cartridge 24 within the member 22. A cover 26 of generally rectangular cross section includes an upper wall 28 having a cylindrical extension 30 which partially surrounds the member 22 and has its terminal or free edge 32 crimped within an annular groove of the member 22 to thereby secure this member to the cover. The cover seats on plate 12 and includes a return bent flange 34 which extends over the sides of the plate 12 except in the area of the ears 16. At a number of places 36, the flange 34 is crimped over the plate 12 to assemble the cover to this plate. A sealing bead or washer 38 is provided between the flange 34 and the plate 12 to seal the sensor.

A generally cylindrically shaped seismic mass 40 includes a generally oval shaped central bore 42, FIG. 3, receiving the guide tube 18 therethrough. The tube 18 includes an intermediate annular integral rib 44 which locates an annular mounting member 46 secured to the outer surface of the tube. As shown in FIG. 2, member 46 includes a pair of diametrically aligned openings which receive respective guide shafts or pins 48 which in turn are secured within respective diametrically aligned openings in the mass 40. Thus the mass 40 is mounted on the tube 14 for pivotal movement about an axis transverse of the axis of the tube.

A cylindrical firing pin 50 is slidably received within the tube 18 and a coil compression spring 52 seating between the lower end of the firing pin and the flanged end 20 of tube 18 continually biases the firing pin upwardly of the tube or from its unactuated position shown in FIGS. 1 and 2 to its actuated position shown in FIG. 4 wherein the tapered point 54 of the firing pin engages the cartridge 24 to fire the cartridge. Although not shown in the drawings, it will be understood that the cartridge 24 may be connected by suitable means, such as pyrocord, with detonators or other suitable means providing rupture of a diaphragm of a pressure vessel in order to permit the release of the contents of the vessel for inflation of an inflatable occupant restraint cushion. Alternatively, the firing pin 50 may be elongated and the tapered point 54 thereof may be located outwardly of the member 22 when in actuated position so as to directly rupture such a diaphragm or to directly fire or initiate the firing of detonators controlling rupture of such a diaphragm. Alternatively, the firing pin may close a switch initiating electrical rupture of the diaphragm or electrical ignition of a gas generator.

The firing pin 52 includes a shoulder means or peripheral semi-cylindrical continuous groove 56 and the guide tube 18 includes a pair of diametrically opposite enlarged cylindrical openings 58, as shown in FIG. 2. The mass 40 includes a pair of diametrically opposite extensions or shoulders 60 along its minor axis, each of which includes an axially and radially tapered planar surface 62 provided with a shoulder means or shallow groove 64. The centers of generation of the grooves 64 are coplanar with the mass axis of movement defined by pins 48. As shown in FIGS. 2 and 3, a ball 66 is received within each of the openings 58 in engagement with the groove 56 and a respective groove 64 under the biasing action of the spring 52 to normally detent or releasably hold the firing pin 50 in its unactuated position and hold the mass 40 against movement.

When an acceleration pulse of predetermined amplitude and time is received by the mass 40 and is directed generally normal to the plane containing the axis thereof and the centers of generation of grooves 64, the mass 40 will swing about the axis thereof to move the grooves 64 out of engagement with the balls 66 and permit release of the firing pin 50 under the action of spring 52 for movement to actuated position. The movement of the mass about its axis is accompanied by a slight radial inward and downward movement of the balls 66 and a slight further compression of spring 52 prior to release of the balls 66.

It will further be noted that the axis defined by the pins 48 is generally parallel to and coplanar with the axes of the openings 58 and the centers of the balls 66.

Thus, this invention provides an improved sensor.

We claim:

1. A sensor comprising, in combination, a support, an elongated annular guide secured to the support, an operator mounted within the guide for movement between actuated and unactuated positions, means biasing the operator to actuated position, a seismic mass, shaft means pivotally mounting the mass on the guide for movement independently thereof about a fixed axis transverse of the direction of movement of the operator, cooperating pairs of shoulder means on the operator and mass, a ball engageable with each cooperating pair of shoulder means to block pivotal movement of the mass and hold the operator in unactuated position, said seismic mass being responsive to an acceleration pulse of predetermined amplitude and time directed generally angularly to the mass axis to swing the mass about such axis and move the shoulder means thereof out of cooperating relationship to the operator shoulder means to permit the biasing means to move the operator to actuated position as the balls move out of engagement with each pair of shoulder means.

2. A sensor comprising, in combination, a support, an elongated annular guide secured to the support, an operator mounted within the guide for movement between actuated and unactuated positions, means biasing the operator to actuated position, a seismic mass, shaft means pivotally mounting the mass on the guide for movement independently thereof about a fixed axis transverse of the direction of movement of the operator, shoulder means on the operator, a plurality of shoulder means on the mass, each directed axially and radially of the direction of movement of the operator and respectively associated in pairs with the operator shoulder means, a ball engageable with each cooperating pair of shoulder means to block pivotal movement of the mass and hold the operator in unactuated position, said seismic mass being responsive to an acceleration pulse of predetermined amplitude and time directed generally angularly to the mass axis to swing the mass about such axis and move the shoulder means thereof out of cooperating relationship to the operator shoulder means to permit the biasing means to move the operator to actuated position as the balls move out of engagement with each pair of shoulder means.

3. A sensor comprising, in combination, a support, an elongated annular guide secured to the support, an operator mounted within the guide for movement between actuated and unactuated positions, means biasing the operator to actuated position, a seismic mass, shaft means pivotally mounting the mass on the guide for movement independently thereof about a fixed axis transverse of the direction of movement of the operator, cooperating pairs of arcuate shoulder means on the operator and mass, a ball tangentially engageable with each cooperating pair of shoulder means to block pivotal movement of the mass and hold the operator in unactuated position, the centers of generation of the arcuate shoulder means being coplanar with the mass axis and centers of the balls, said seismic mass being responsive to an acceleration pulse of predetermined amplitude and time directed generally normal to such plane to swing the mass about the axis thereof and move the shoulder means thereof out of cooperating relationship to the operator shoulder means to permit the biasing means to move the operator to actuated position as the balls move out of engagement with each pair of shoulder means.

4. A sensor comprising, in combination, a support, an elongated annular guide secured to the support, an annular operator mounted within the guide for movement between actuated and unactuated positions and including a peripheral radially outwardly opening groove, means biasing the operator to actuated position, a seismic mass, shaft means pivotally mounting the mass on the guide for movement independently thereof about a fixed axis transverse of the direction of movement of the operator, a pair of grooves on the mass opening toward the operator groove and directed axially and radially of the mass axis, each cooperating with the operator groove to provide cooperating pairs of shoulder means, a ball engageable with each cooperating pair of shoulder means to block pivotal movement of the mass and hold the operator in unactuated position, said seismic mass being responsive to an acceleration pulse of predetermined amplitude and time directed generally angularly to the mass axis to swing the mass about such axis and move the grooves thereof out of cooperating relationship to the operator groove to permit the biasing means to move the operator to actuated position as the balls move out of engagement with each pair of shoulder means, a plane bisecting the grooves containing the mass axis and the centers of the balls.

5. A sensor comprising, in combination, a support, an elongated annular guide secured to the support, an operator mounted within the guide for movement between actuated and unactuated positions, means biasing the operator to actuated position, an annular seismic mass surrounding the guide, shaft means pivotally mounting the mass adjacent one end thereof on the guide for independent movement relative thereto about a fixed axis transverse of the direction of movement of the operator, cooperating pairs of shoulder means on the operator and mass adjacent the other end thereof, a ball engageable with each cooperating pair of shoulder means to block pivotal movement of the mass and hold the operator in unactuated position, the centers of the balls being coplanar with the mass axis, said seismic mass being responsive to an acceleration pulse of predetermined amplitude and time directed generally normal to the mass axis and intermediate the ends thereof to swing the mass about such axis and move the shoulder means thereof out of cooperating relationship to the operator shoulder means to permit the biasing means to move the operator to actuated position as the balls move out of engagement with each pair of shoulder means.

* * * * *